(12) United States Patent
Kwasniewski et al.

(10) Patent No.: US 10,161,502 B2
(45) Date of Patent: Dec. 25, 2018

(54) AXLE ASSEMBLY HAVING A DAM MODULE

(71) Applicant: ArvinMeritor Technology, LLC, Troy, MI (US)

(72) Inventors: Dale Kwasniewski, Galesburg, MI (US); Andrew Bodary, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 455 days.

(21) Appl. No.: 14/696,542

(22) Filed: Apr. 27, 2015

(65) Prior Publication Data

US 2016/0312879 A1 Oct. 27, 2016

(51) Int. Cl.
*F16H 57/04* (2010.01)
*F16H 57/037* (2012.01)

(52) U.S. Cl.
CPC ..... *F16H 57/0483* (2013.01); *F16H 57/0402* (2013.01); *F16H 57/045* (2013.01); *F16H 57/0423* (2013.01); *F16H 57/0445* (2013.01); *F16H 57/0453* (2013.01); *F16H 57/0457* (2013.01)

(58) Field of Classification Search
None
See application file for complete search history.

(56) References Cited

U.S. PATENT DOCUMENTS

| 1,966,434 | A | * | 7/1934 | Barker | F16H 57/0483 |
| | | | | | 184/11.1 |
| 2,242,195 | A | | 5/1941 | Teker et al. | |
| 5,540,300 | A | * | 7/1996 | Downs | F16H 57/0412 |
| | | | | | 184/104.1 |
| 5,839,327 | A | * | 11/1998 | Gage | F16H 57/0412 |
| | | | | | 74/607 |
| 6,132,329 | A | | 10/2000 | Tison | |
| 8,858,381 | B2 | | 10/2014 | Trost | |
| 8,974,342 | B2 | | 3/2015 | Kwasniewski et al. | |

FOREIGN PATENT DOCUMENTS

| CN | 103382996 A | 11/2013 |
| DE | 710894 C | 9/1941 |
| EP | 1375970 A2 | 1/2004 |
| EP | 2660493 A1 | 11/2013 |
| EP | 2708777 A1 | 3/2014 |
| GB | 1115446 A | 5/1968 |
| JP | S5937462 U | 3/1984 |

(Continued)

OTHER PUBLICATIONS

U.S. Appl. No. 14/169,454, filed Jan. 31, 2014.

(Continued)

*Primary Examiner* — Robert W Hodge
*Assistant Examiner* — Ryan P Dodd
(74) *Attorney, Agent, or Firm* — Brooks Kushman P.C.

(57) ABSTRACT

An axle assembly having a dam module. The dam module may include a dam, an upper brace, and a lower brace. The dam may be at least partially disposed in an arm portion of a housing of the axle assembly. The upper brace and the lower brace may be disposed proximate the dam. The upper brace may transport lubricant to the dam.

20 Claims, 5 Drawing Sheets

(56) References Cited

FOREIGN PATENT DOCUMENTS

JP         2005188673 A     7/2005
JP         2012210839 A     11/2012

OTHER PUBLICATIONS

European Patent Office, Extended European Search Report for the corresponding European Patent Application No. 16153431.8 dated Jan. 19, 2017.
The State Intellectual Property Office of China, First Office Action for the corresponding Chinese Patent Application No. 201610046862.7 dated Nov. 1, 2017.

\* cited by examiner

AXLE ASSEMBLY HAVING A DAM MODULE

TECHNICAL FIELD

This document relates to an axle assembly having a dam module.

BACKGROUND

An axle assembly lubrication apparatus is disclosed in U.S. Pat. No. 6,132,329.

SUMMARY

In at least one embodiment, an axle assembly is provided. The axle assembly may include a housing, a differential, and a dam module. The housing may have a center portion and an arm portion. The arm portion may extend from the center portion and may receive an axle. The differential may be disposed in the center portion and may have a ring gear. The dam module may include a dam, an upper brace, and a lower brace. The dam may be disposed in the arm portion. The dam may have an axle opening and an inlet opening. The axle may extend through the axle opening. The inlet opening may be disposed above the axle. The upper brace may be disposed above the ring gear and may have a channel that may receive and transport lubricant to the inlet opening. The lower brace may be disposed below the ring gear and may extend from the dam.

In at least one embodiment, an axle assembly is provided. The axle assembly may include a housing, a differential, and a dam module. The housing may have a center portion, a first arm portion, and a second arm portion. The first and second arm portions may extend from the center portion. The differential may be disposed in the center portion and may have a ring gear. The dam module may include a first dam, a second dam, an upper brace, and a lower brace. The first dam may be disposed in the first arm portion. The second dam may be disposed in the second arm portion. The upper brace may be disposed above the ring gear and may extend between the first dam and the second dam. The lower brace may be disposed below the ring gear and may extend from the first dam to the second dam.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
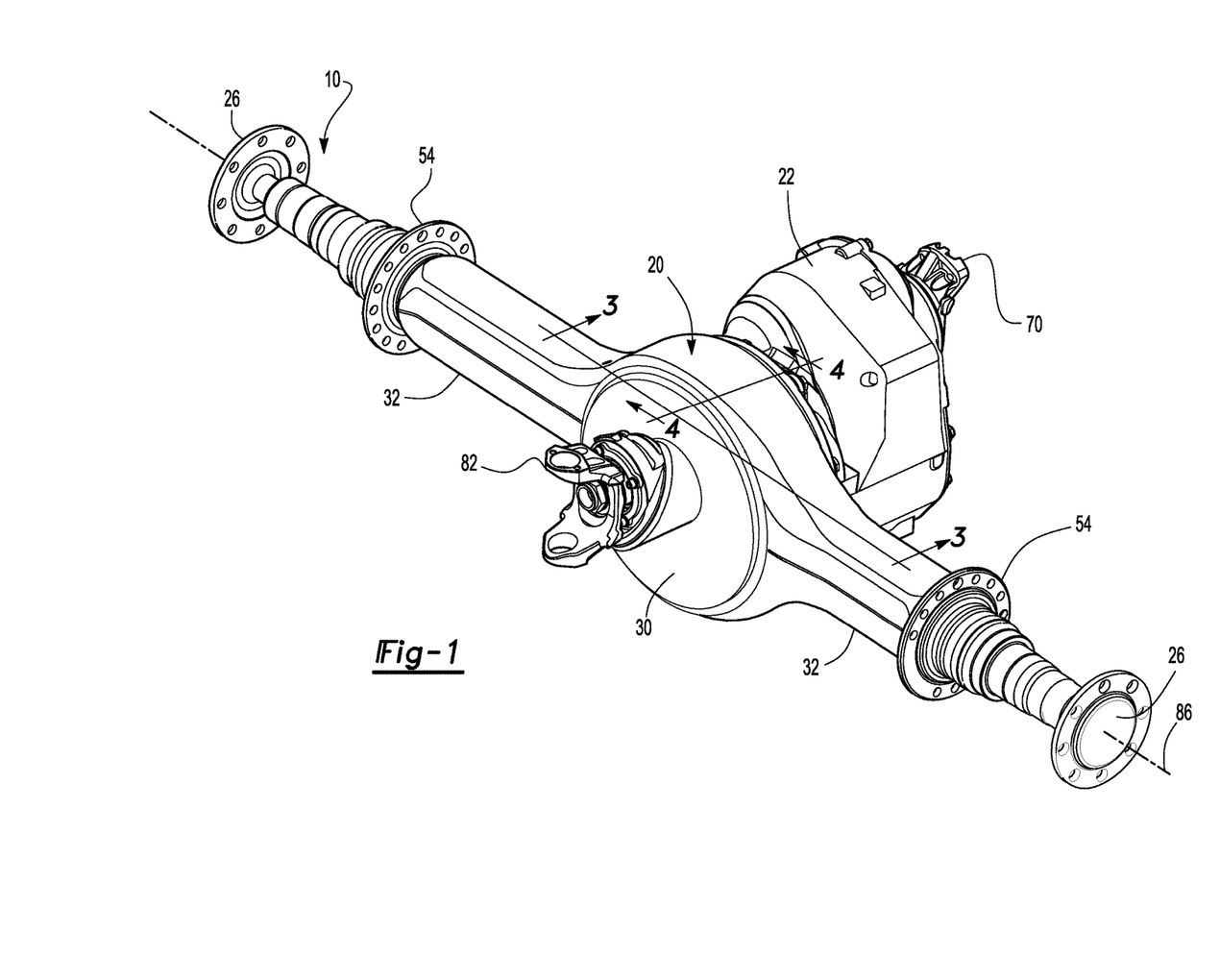
FIG. 1 is a perspective view of an axle assembly.
Figure 2:
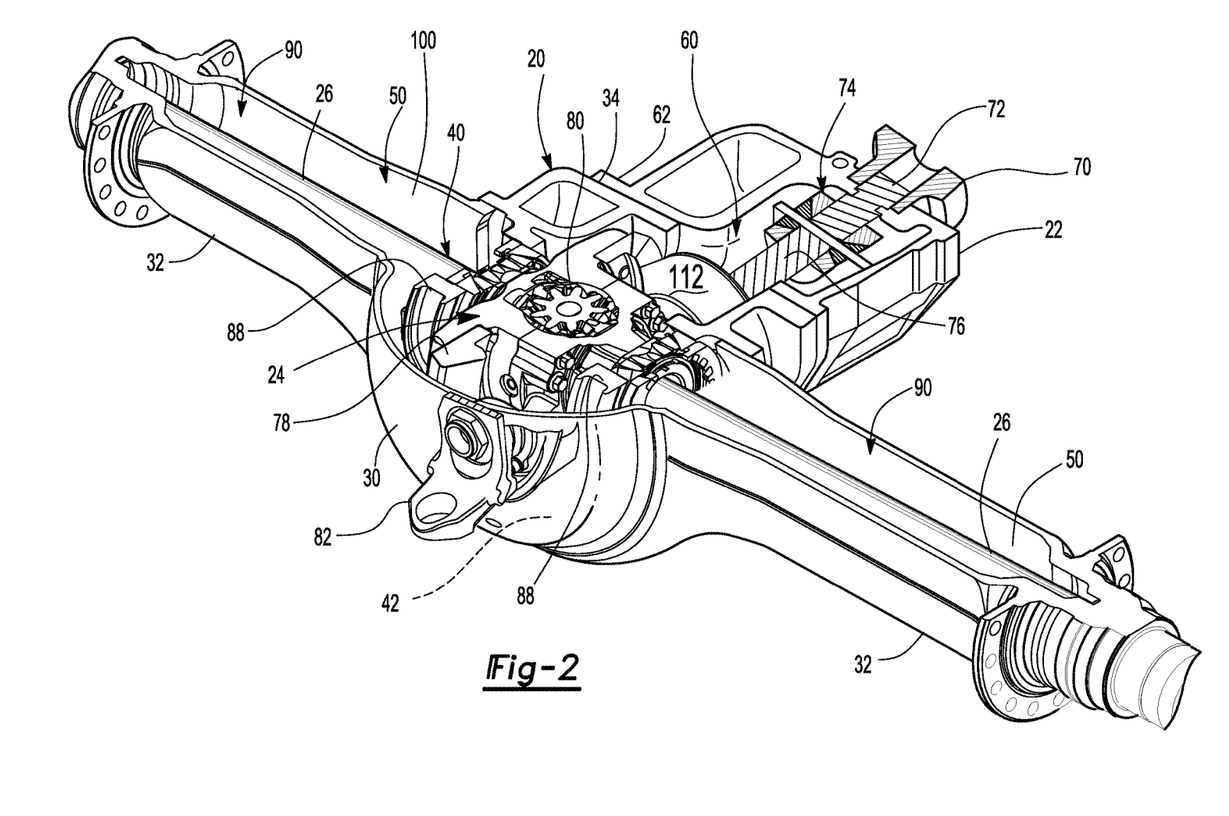
FIG. 2 is a section view of the axle assembly of FIG. 1 with a dam module omitted for clarity.

Referring to FIGS. 1 and 2, an exemplary axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 shown in FIGS. 1 and 2 may be part of a tandem axle configuration or multi-axle configuration that may include a plurality of axle assemblies that may be connected in series. In at least one embodiment, the axle assembly 10 may include a housing 20, a carrier housing 22, a differential 24, at least one axle 26, and a dam module 28.

The housing 20 may receive various components of the axle assembly 10. In addition, the housing 20 may facilitate mounting of the axle assembly 10 to the vehicle. The housing 20 may include multiple components that may be assembled together in any suitable manner, such as by welding and/or with one or more fasteners. In at least one embodiment, the housing 20 may include a center portion 30, at least one arm portion 32, and a carrier housing mounting surface 34.

Figure 3:
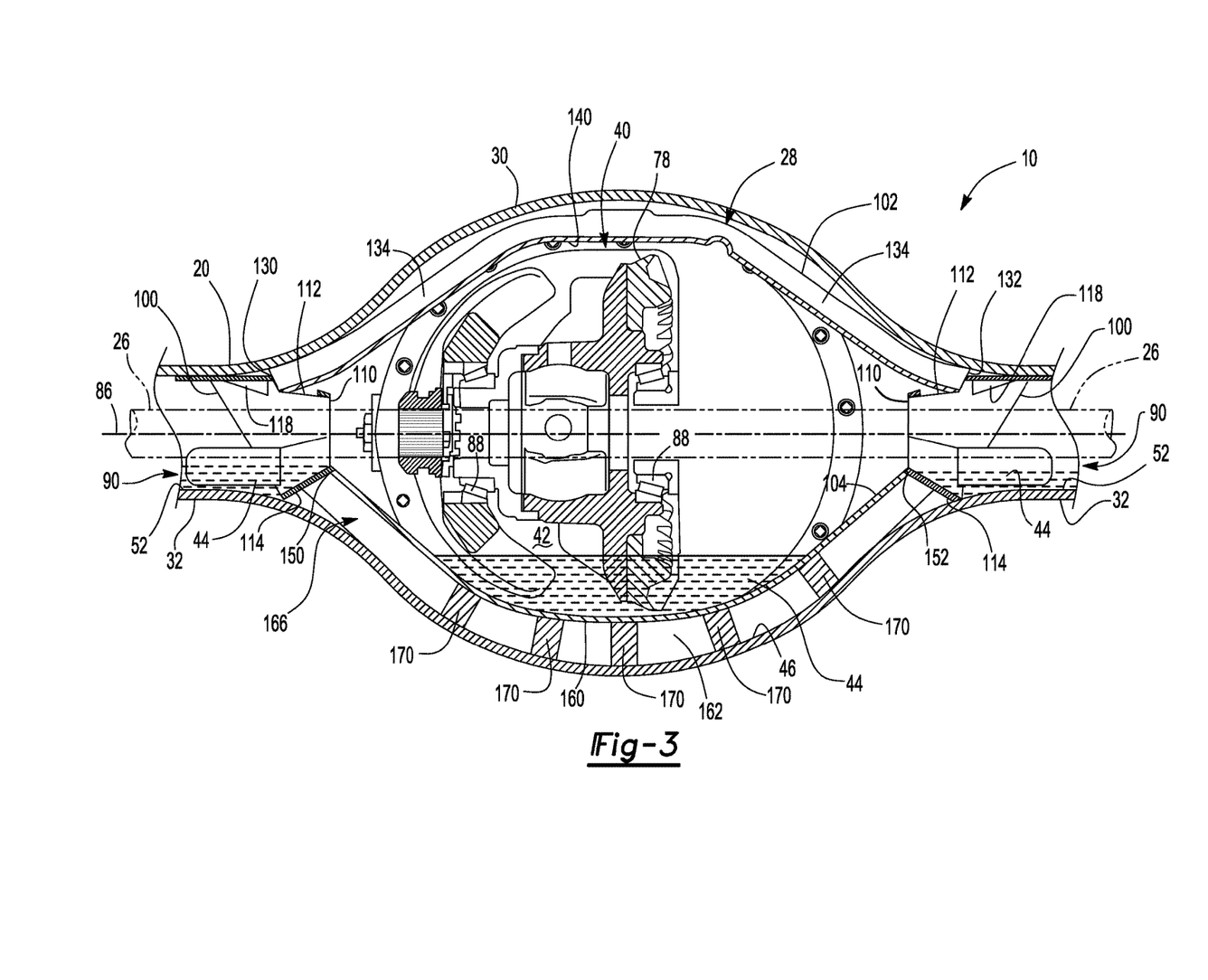
FIG. 3 is a section view of the axle assembly along section line 3-3 with a differential unit omitted for clarity.

The center portion 30 may be disposed proximate the center of the housing 20. The center portion 30 may define a center portion cavity 40 that may receive the differential 24 and at least a portion of the dam module 28. As is best shown in FIG. 3, a region of the center portion 30 or center portion cavity 40 located below the differential 24 may at least partially define a sump portion 42 that may contain lubricant 44. Splashed lubricant may flow down the sides of the center portion 30 and may flow over internal components of the axle assembly 10 and gather in the sump portion 42. The lubricant 44, which may be a liquid such as oil, may lubricate components of the axle assembly 10, such as the differential 24 and various bearings.

Figure 4:
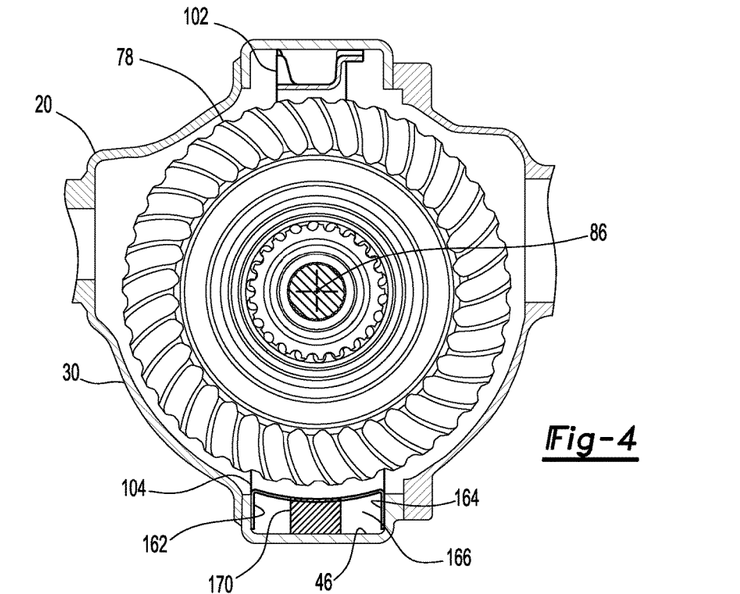
FIG. 4 is a section view of the axle assembly along section line 4-4.

Referring to FIGS. 3 and 4, the center portion 30 may have a trench 46. The trench 46 may extend along the bottom of the center portion 30 and may be configured as a recess that may be disposed below the differential 24 and that may extend away from the differential 24. In at least one embodiment, the trench 46 may extend between the arm portions 32. As such, the trench 46 may extend substantially parallel to the axles 26 and may extend from a first arm portion 32 to the second arm portion 32 in one or more embodiments. The first arm portion 32 and the second arm portion 32 may designate the left and right arm portions in FIGS. 1 and 2 or vice versa. In addition, the trench 46 may be disposed directly below the axles 26 and may extend away from the axles 26 as is best shown in FIG. 4. The trench 46 may receive and position a portion of the dam module 28, such as a lower brace of the dam module 28, as will be discussed in greater detail below.

One or more arm portions 32 may extend from the center portion 30. In FIGS. 1-3, two arm portions 32 are provided that extend in opposite directions from the center portion 30 and away from the differential 24. The arm portions 32 may have substantially similar configurations. For example, the arm portions 32 may each have a hollow configuration or tubular configuration that may extend around the corresponding axle 26 and may help separate or isolate the axle 26 from the surrounding environment. An arm portion 32 or a portion thereof may be integrally formed with the center portion 30 in one or more embodiments. As is best shown in FIG. 2, each arm portion 32 may define an arm cavity 50 that may receive a corresponding axle 26. The arm portion 32 and arm cavity 50 may be disposed above the sump portion 42 in one or more embodiments. For example, as is best shown in FIG. 3 an internal bottom surface 52 of the arm portion 32 that may be disposed in the arm portion 32 below the axle 26 may at least partially define the arm cavity 50 and may be disposed above the sump portion 42.

Referring to FIG. 1, the arm portion 32 may also include a brake mounting flange 54. The brake mounting flange 54 that may be disposed proximate an end of the arm portion 32 in one or more embodiments.

With continued reference to FIG. 1, the carrier housing mounting surface 34 may face toward and may engage the carrier housing 22. The carrier housing mounting surface 34 may facilitate mounting of the carrier housing 22 to the housing 20. For example, the carrier housing mounting surface 34 may have a set of holes that may be aligned with corresponding holes on the carrier housing 22. Each hole may receive a fastener, such as a bolt, that may couple the carrier housing 22 to the housing 20.

Referring to FIGS. 1 and 2, the carrier housing 22, which may also be called a differential carrier, may be mounted to the center portion 30 of the housing 20. The carrier housing 22 may support components of the differential 24 and may also define a carrier housing cavity 60 that may receive at least a portion of the differential 24. In at least one embodiment, the carrier housing 22 may have a flange portion 62 that may facilitate mounting of the carrier housing 22 to the housing 20. For example, the flange portion 62 may be disposed proximate and may engage the carrier housing mounting surface 34 of the housing 20 and may have a set of holes that may receive fasteners as previously discussed.

Referring to FIG. 2, the differential 24 may be disposed in the housing 20. The differential 24 may be configured to transmit torque to the vehicle traction wheel assemblies and permit the traction wheel assemblies to rotate at different velocities. An input yoke 70, an input shaft 72, an interaxle differential unit 74, an intermediate shaft 76, a ring gear 78, differential unit 80, and an optional output yoke 82 are shown to facilitate an abbreviated discussion of the operation of the axle assembly 10 and differential 24.

The input yoke 70 may facilitate coupling of the axle assembly 10 to a torque source. For example, the input yoke 70 may be coupled to a drive shaft that may be coupled to an output of a vehicle transmission. Alternatively, the input yoke 70 may be coupled to a connection shaft or prop shaft that may be coupled to an output yoke 82 of another axle assembly or a transfer case. The input yoke 70 may be disposed on the input shaft 72.

The input shaft 72 may be rotatably supported by one or more bearings that may be disposed in the carrier housing cavity 60 of the carrier housing 22. The input shaft 72 may be provided with or may be operatively connected to the interaxle differential unit 74, which may be provided when the axle assembly 10 is operatively connected to another axle assembly. The interaxle differential unit 74 may compensate for speed differences between different drive axle assemblies. In at least one embodiment, the interaxle differential unit 74 may include one or more pinion gears that may be disposed on a spider and may operatively connect the input shaft 72 to the intermediate shaft 76. The interaxle differential unit 74 may also be provided in other locations that the position shown in FIG. 2, such as downstream from the ring gear 78, and may be omitted in one or more embodiments.

The intermediate shaft 76 may be configured to provide torque to the ring gear 78 and to the output yoke 82, if provided. For example, the intermediate shaft 76 may be configured as a drive pinion and may have a pinion gear 84 or may be connected to a pinion gear 84. The pinion gear 84 may have teeth that may mesh with teeth of the ring gear 78. As such, torque that is provided to the input yoke 70 and input shaft 72 may be transmitted to the ring gear 78 via the pinion gear 84.

The ring gear 78 may rotate about an axis 86 and may splash lubricant that accumulates in the sump portion 42 as it rotates. As will be discussed in more detail below, such lubricant 44 may be captured and temporarily retained or stored in a lubricant reservoir to reduce the volume of lubricant 44 in the sump portion 42 under various operating conditions. Reducing the volume of lubricant in the sump portion 42 may reduce churning losses or frictional drag that may be exerted upon the ring gear 78 by the lubricant 44 and may improve vehicle fuel economy. The ring gear 78 may be mounted to or may be operatively connected to the differential 24. Torque may be transmitted from the ring gear 78 to each axle 26 via the differential 24.

The differential unit 80 may be generally disposed in the center portion 30 of the housing 20 and may be configured to permit the axles 26 to rotate at different speeds. The differential unit 80 may be supported by a pair of differential bearing 88 and may be connected to the axles 26. As such, the differential unit 80 may receive torque via the ring gear 78 and provide torque to the axles 26.

Referring to FIGS. 2 and 3, the axles 26 may transmit torque from the differential 24 to corresponding traction wheel assemblies. In FIG. 2, two axles 26 are provided such that each axle 26 extends through a different arm cavity 50. The axles 26 may extend along and may be rotated about the axis 86 by the differential 24. Each axle 26 may have a first end and a second end. The first end may be coupled to the differential 24. The second end may be disposed opposite the first end and may be located outside of the arm portion 32 of the housing 20. An axle flange may be disposed proximate the second end of the axle 26 and may facilitate mounting of a wheel end assembly and traction wheel assembly. An axle bearing may be provided near the second end of the axle 26 to rotatably support the axle 26.

Figure 5:
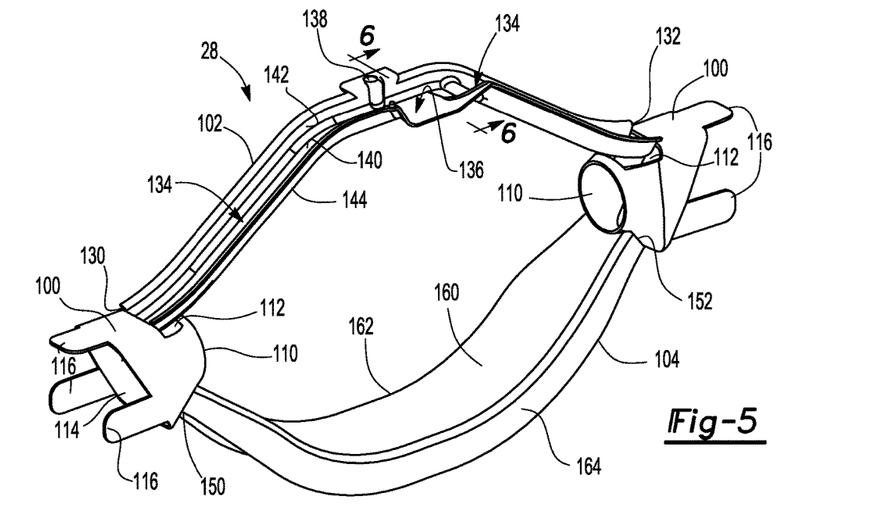
FIG. 5 is a perspective view of the dam module.

Referring to FIGS. 3-5, the dam module 28 may be disposed in the housing 20. The dam module 28 may cooperate with the arm portion 32 of the housing 20 to create a lubricant reservoir 90 that may receive lubricant 44 and/or temporarily contain or retain a volume of lubricant 44 that might otherwise accumulate in the sump portion 42. The dam module 28 may include at least one dam 100, an upper brace 102, and a lower brace 104.

The dam 100 may be at least partially disposed in the arm portion 32 of the housing 20. For example, a first dam 100 may be disposed in the first arm portion 32 and a second dam 100 may be disposed in the second arm portion 32. The dam 100 may be made of any suitable material. For example, the dam 100 may be made of a polymeric material, which may allow the dam 100 to be formed into complex shapes and may help reduce cost and weight. The dam 100 may have an axle opening 110, an inlet opening 112, a lower wall 114, and one or more arms 116.

The axle opening 110 may be configured to receive the axle 26. As such, the axle 26 may extend through the axle opening 110. The axle opening 110 may be disposed proximate an end of the dam 100 that may face toward the differential 24. As such, the axle opening 110 may be disposed in the center portion 30 or the arm portion 32 depending on the length of the dam 100. The axle opening 110 may be spaced apart from and may be disposed above the bottom surface 52 of the arm portion 32. In addition, the dam 100 may be tapered such that the dam 100 becomes narrower in a direction that extends away from the arms 116 and toward the axle opening 110. As such, the axle opening 110 may be disposed closer to the axle 26 and the axis 86 than an adjacent region of the arm portion 32, which in turn may help the dam 100 temporarily retain lubricant 44 in the arm portion 32. The axle opening 110 may allow lubricant 44 to flow from the lubricant reservoir 90 through the axle opening 110 and into the sump portion 42. For example, lubricant 44 may flow through the axle opening 110 and into the sump portion 42 when the lubricant reservoir 90 is sufficiently full or lubricant 44 reaches the bottom of the axle opening 110. The axle opening 110 that is provided with the first dam 100 may be referred to as a first axle opening. The axle opening 110 that is provided with the second dam 100 may be referred to as a second axle opening.

The axle opening 110 may have any suitable configuration. For example, the axle opening 110 may have a substantially circular configuration and may be radially disposed with respect to the axis 86 as shown in FIG. 5. Alternatively, the axle opening 110 may be provided with a noncircular configuration. An example of an axle opening 110 with a noncircular configuration is shown in FIG. 6.

Figure 6:
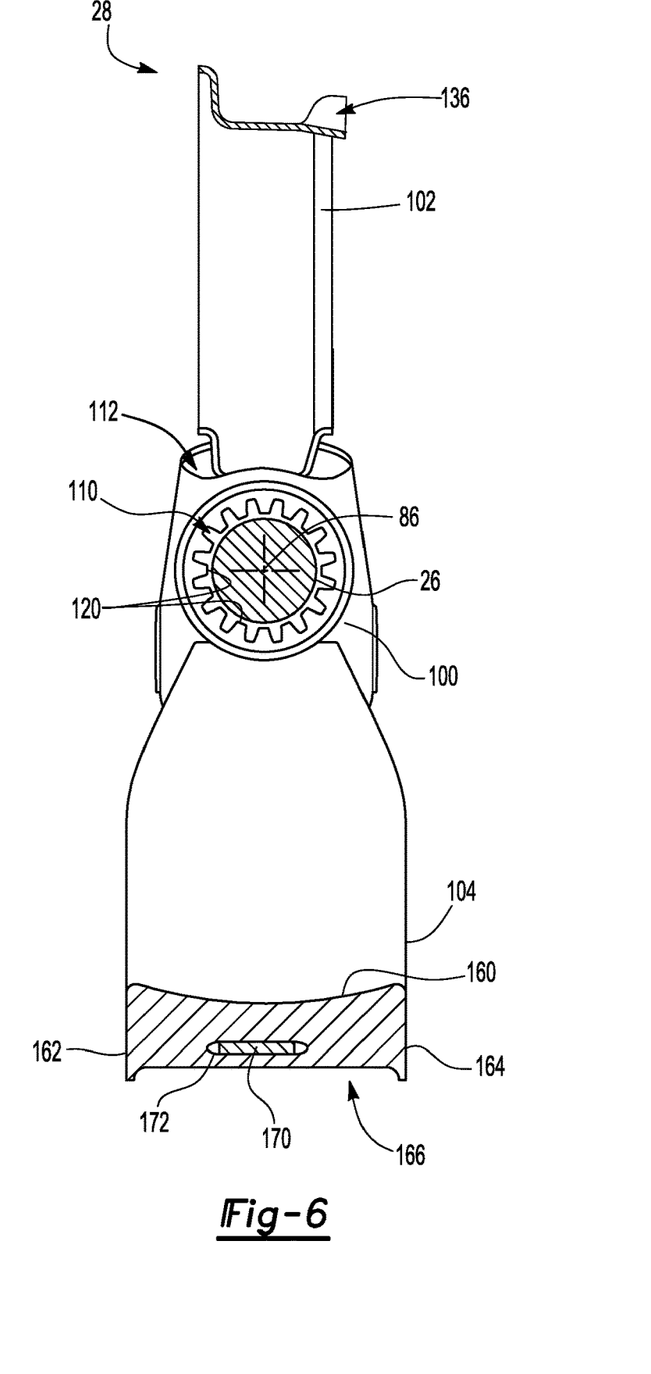
FIG. 6 is a section view of another embodiment of the dam module.

In FIG. 6, a set of one or more tabs 120 are disposed in the axle opening 110. The members of the set of tabs 120 may extend toward the axis 86 and/or may extend toward the center portion 30 of the housing 20. For instance, the tabs 120 may extend in a non-perpendicular relationship to the axis 86. The tabs 120 may be spaced apart from each other and may be configured to flex when engaged by the axle 26. For example, the tabs 120 may be configured to flex and temporarily support the axle 26 when the axle 26 is installed or inserted through the axle opening 110, which may help prevent damage to the dam 100 during assembly. The tabs 120 may be completely spaced apart from the axle 26 when the axle 26 is installed and coupled to the differential 24. As such, the tabs 120 may not interfere with rotation an installed axle 26. The tabs 120 may be arranged in a continuous repeating manner around the axis 86 as shown in FIG. 6. Alternatively, the tabs 120 may be arranged such that one or more tabs 120 do not extend into continuous repeating manner around the axis 86. For example, one or more tabs 120 may be provided below the axis 86 and no tabs may be provided above the axis 86.

The inlet opening 112 may be disposed above the axle 26 and/or the axle opening 110. In addition, the inlet opening 112 may be completely spaced apart from the axle opening 110 and may be disposed further from the differential 24 than the axle opening 110 as is best shown in FIG. 3. The inlet opening 112 may be configured to receive lubricant 44. For example, the inlet opening 112 may receive lubricant 44 that may be provided by the upper brace 102 as will be discussed in more detail below. The inlet opening 112 that is provided with the first dam 100 may be referred to as a first inlet opening. The inlet opening 112 that is provided with the second dam 100 may be referred to as a second inlet opening.

The lower wall 114 may be disposed below the axle opening 110. In addition, the lower wall 114 may extend between the axle opening 110 and the housing 20. For example, the lower wall 114 may extend from the axle opening 110 to the bottom surface 52 of the arm portion 32. The lower wall 114 may extend at an upward angle such that the lower wall 114 may become closer to the axis 86 in a direction that extends toward the axle opening 110. The lower wall 114 may inhibit lubricant 44 from entering the trench 46 or inhibit lubricant 44 from entering a cavity in the lower brace 104, such as a cavity that may be disposed between the lower brace 104 and the housing 20 as will be discussed in more detail below.

One or more arms 116 may extend from the dam 100. In the embodiment shown, three arms 116 are provided; however, a greater or lesser number of arms 116 may be provided in one or more embodiments. The arms 116 may extend away from the axle opening 110 and may be disposed proximate an end of the dam 100. As such, the inlet opening 112 may be disposed between the axle opening 110 and one or more arms 116 as is best shown in FIG. 3. The arms 116 may be received in and may engage the arm portion 32 of the housing 20 and may help secure the dam 100 to the arm portion 32. For example, one or more arms 116 may help position the dam 100 in the arm portion 32 via frictional engagement and/or an interference fit. Alternatively or in addition, one or more arms 116 may engage a protrusion that may extend into the arm portion 32 and/or may be coupled to the arm portion 32 such as with one or more fasteners.

Referring to FIG. 3, the dam 100 may include one or more ribs 118. The ribs 118 may help prevent damage to the dam 100 during axle installation. For example, the ribs 118 may absorb an impact load when the axle 26 is inserted through the arm portion 32 toward the differential 24 if the axle 26 is misaligned or positioned at an angle with respect to the axis 86. The ribs 118 may be configured to flex and/or separate from the dam 100 and absorb energy that may otherwise damage the dam 100. Multiple ribs 118 may be arranged around the axis 86 and may be disposed further from the axle opening 110 than the inlet opening 112 in one or more embodiments. In addition, the ribs 118 may be curved, angled, or tapered toward the axle opening 110 to help direct the axle 26 toward the axle opening 110 as the axle 26 is inserted and advanced through the arm portion 32 toward the differential 24.

Optionally, the dam 100 may include an outlet opening that may be disposed proximate the axle opening 110. The outlet opening may provide another path through which lubricant 44 may exit the lubricant reservoir 90 and flow to the sump portion 42. The outlet opening may be provided with an outlet valve. The outlet valve, if provided, may control the flow of lubricant 44 out of the lubricant reservoir 90 through the outlet opening. The outlet valve may have any suitable configuration. For example, the outlet valve may be a passive valve, such as a bimetallic valve that may include different metals or metal alloys that expand at different rates in response to temperature. As such, a bimetallic valve may be configured to open at elevated axle assembly operating temperatures to permit the flow of lubricant 44 from the lubricant reservoir 90 to the sump portion 42 and may close at lower temperatures. The outlet valve may also be an active valve that may have an actuator. For example, an active valve may have a pneumatic, hydraulic, electrical, or electromechanical actuator that may be controlled by a controller.

Referring to FIG. 3, the upper brace 102 may be disposed proximate the top of the housing 20. For example, the upper brace 102 may be disposed proximate and may engage a top internal surface of the center portion 30. In addition, the upper brace 102 may be disposed above the differential 24, axles 26, and the ring gear 78. As such, the upper brace 102 may be spaced apart from the ring gear 78 so as to not interfere with rotation of the ring gear 78 or strip the lubricant 44 from the ring gear 78. The upper brace 102 may be made of any suitable material. For example, the upper brace 102 may be made of a polymeric material, which may allow the upper brace 102 to be formed into complex shapes and may help reduce cost and weight.

The upper brace 102 may extend between the arm portions 32 of the housing 20 and may extend between the first dam 100 and the second dam 100. For example, the upper brace 102 may have a first end 130 and a second end 132.

The first end 130 may be disposed proximate the first dam 100. For example, the first end 130 may be received in the inlet opening 112 of the first dam 100 and may engage the first dam 100. It is contemplated that the first end 130 may be fastened to first dam 100 or may be fixedly positioned on the first dam 100 in one or more embodiments, such as with a fastener or mating features or with an adhesive. It is also contemplated that the first end 130 may not engage the first dam 100 in one or more embodiments.

The second end 132 may be disposed proximate the second dam 100 and may be disposed opposite the first end 130. The second end 132 may be received in the inlet opening 112 of the second dam 100 and may engage the second dam 100. It is contemplated that the second end 132 may be fastened to second dam 100 or may be fixedly positioned on the second dam 100 in one or more embodiments, such as with a fastener or mating features or with an adhesive. It is also contemplated that the second end 132 may not engage the second dam 100 in one or more embodiments.

The upper brace 102 may also have a channel 134, an aperture 136, and a mounting feature 138 in one or more embodiments.

The channel 134 may receive lubricant and transport lubricant from the center portion 30 to the inlet opening 112. For example, the channel 134 may be configured to receive or capture lubricant 44 that may be splashed or sprayed inside the housing 20 by the ring gear 78. As is best shown in FIG. 3, the channel 134 or a portion thereof may slope downwardly through the center portion 30 of the housing 20 toward a dam 100 to facilitate the flow of lubricant 44 to a lubricant reservoir 90. In at least one embodiment, the channel 134 may extend from the first end 130 to the second end 132 of the upper brace 102. As such, the channel 134 may transport lubricant 44 to the inlet opening 112 of the first dam 100 and to the inlet opening 112 of the second dam 100. Alternatively, it is contemplated that multiple channels may be provided in one or more embodiments and/or that the channel 134 may provide lubricant 44 to a single dam 100 rather than multiple dams 100.

Referring to FIGS. 3 and 5, the channel 134 may have any suitable configuration. For example, the channel 134 may be configured as a groove that may face upward or generally away from the sump portion 42. The channel 134 may be defined by one or more sides or walls of the upper brace 102, such as a bottom wall 140, a first side wall 142, and a second side wall 144. The bottom wall 140 may be spaced apart from the housing 20. The first side wall 142 may extend upwardly from the bottom wall 140 and toward the housing 20. The second side wall 144 may be disposed opposite the first side wall 142 and may extend upwardly from the bottom wall 140 and toward the housing 20.

The channel 134 may be configured to capture lubricant and provide captured lubricant to a lubricant reservoir 90 when the vehicle is travelling above a threshold speed. For example, the rotation speed of the ring gear 78 may be configured to may increase as vehicle speed increases. Increased rotational speed of the ring gear 78 may change the spray profile of lubricant 44 that is sprayed or splashed by the ring gear 78. The channel 134 may be configured, positioned, or oriented such that a negligible amount of lubricant 44 may be captured below a threshold speed and greater amount of lubricant 44 is captured at or above the threshold speed. The threshold speed may be established based on vehicle development testing and evaluation of the performance characteristics of the axle assembly 10. As a non-limiting example, the threshold speed may be a speed such as around 30 mph (48 km/h). As such, the channel 134 and the lubricant reservoir 90 may be configured such that the level of lubricant 44 in the sump portion 42 may drop below the differential bearings 88 above the threshold speed to help reduce frictional drag on the ring gear 78.

The aperture 136 may receive lubricant 44 that is sprayed or splashed by the differential 24. For example, the aperture 136 may be configured as an opening in the upper brace 102 that may receive lubricant 44 that may be splashed by the ring gear 78. Alternatively or in addition, the aperture 136 may receive or capture lubricant 44 that may drip from an interior surface of the center portion 30. The aperture 136 may be disposed directly above the ring gear 78 and may face in a direction that may be disposed opposite the primary direction of rotation of the ring gear 78 in one or more embodiments.

One or more mounting features 138 may be provided with the upper brace 102 to facilitate coupling of the upper brace 102 to the housing 20. The mounting feature 138 may have any suitable configuration, such as a male configuration, female configuration, or combinations thereof. In the embodiment shown in FIG. 5, the mounting feature 138 is configured as a hole that may receive a fastener that may couple the upper brace 102 to the housing 20. It is contemplated that the upper brace 102 may be provided without a mounting feature in one or more embodiments. As such, other axle assembly components, such as the housing 20 and/or the dams 100, may help position or inhibit movement of the upper brace 102.

Referring to FIGS. 3-5, the lower brace 104 may be disposed proximate the bottom of the housing 20. For example, the lower brace 104 may be received in the trench 46. As such, the lower brace 104 may be disposed below the differential 24, axles 26, and the ring gear 78. The lower brace 104 may be spaced apart from the ring gear 78 so as to not interfere with rotation of the ring gear 78. In addition, the lower brace 104 may be spaced apart from the ring gear 78 and may strip excess oil from the ring gear 78 to help decrease windage losses and reduce rotating mass on the ring gear 78. The lower brace 104 may be made of any suitable material. For example, the lower brace 104 may be made of a polymeric material, which may allow the lower brace 104 to be formed into complex shapes and may help reduce cost and weight.

Referring to FIG. 3, the lower brace 104 may extend between the arm portions 32 of the housing 20 and may extend between the first dam 100 and the second dam 100. For example, the lower brace 104 may have a first end 150 and a second end 152. The first end 150 may be disposed proximate the first dam 100. For example, the first end 150 may engage the first dam 100 below the axle opening 110 of the first dam 100. The second end 152 may be disposed proximate the second dam 100 and may be disposed opposite the first end 150. The second end 152 may be disposed proximate the second dam 100 and may engage the second dam 100 below the axle opening 110 of the second dam 100.

As such, the lower brace 104 may be completely disposed below the axle opening 110 of the first dam 100 and the axle opening 110 of the second dam 100 in one or more embodiments.

The lower brace 104 may have a plurality of walls. For example, the lower brace 104 may include a first lower brace wall 160, a first lower brace side wall 162, and a second lower brace side wall 164.

The first lower brace wall 160 may be disposed proximate and may face toward the ring gear 78. As such, the first lower brace wall 160 may be disposed between the ring gear 78 and the bottom of the center portion 30 or between the ring gear 78 and the trench 46. As is best shown in FIG. 3, first lower brace wall 160 or portion thereof may be spaced apart from the housing 20. In addition, the first lower brace wall 160 may extend from the first dam 100 to the second dam 100. As such, the first lower brace wall 160 may extend from the lower wall 114 of the first dam 100 to the lower wall 114 of the second dam 100. As is best shown in FIG. 4, the first lower brace wall 160 may have a cross section that may be curved and may generally follow the curvature of the center portion 30 and/or the ring gear 78. As such, the first lower brace wall 160 may extend along an arc between the first lower brace side wall 162 and the second lower brace side wall 164. The arc may be radially disposed with respect to the axis 86 in one or more embodiments. Providing a curved first lower brace wall 160 may help improve lubricant flow and may reduce churning losses or frictional drag exerted by the lubricant on the ring gear 78, thereby increasing the mechanical efficiency of the drive axle and potentially improving vehicle fuel economy.

The first lower brace side wall 162 may extend from the first lower brace wall 160. For example, the first lower brace side wall 162 may extend from an end of the first lower brace wall 160 into the trench 46. As such, the first lower brace side wall 162 may extend away from the ring gear 78.

The second lower brace side wall 164 may be disposed opposite the first lower brace side wall 162 and may extend from the first lower brace wall 160. For example, the second lower brace side wall 164 may extend from an end of the first lower brace wall 160 into the trench 46. As such, the second lower brace side wall 164 may extend away from the ring gear 78 and may be spaced apart from the first lower brace side wall 162.

The first lower brace side wall 162 and/or the second lower brace side wall 164 may help retain the lower brace 104 in the trench 46. For example, the first lower brace side wall 162 and the second lower brace side wall 164 may engage the center portion 30 and may exert force on the center portion 30 hold the lower brace 104 and a stationary position.

The lower brace 104 may have a lower brace cavity 166. The lower brace cavity 166 may be disposed between the first lower brace wall 160 in the bottom of the trench 46. In addition, the lower brace cavity 166 may be disposed between the first lower brace side wall 162 and the second lower brace side wall 164. The lower brace cavity 166 may not receive lubricant. For example, the lower brace 104 may cooperate with the trench 46 to inhibit or prevent lubricant from passing between the housing 20 and the lower brace 104 and entering the lower brace cavity 166. Similarly, the lower wall 114 of the dam 100 may inhibit lubricant from entering the first end 150 and the second end 152 of the lower brace 104 and thereby inhibit lubricant from entering the trench 46.

Referring to FIGS. 3, 4, and 6, one or more magnets 170 may be disposed proximate the lower brace 104. The magnets 170 may exert a magnetic force that may attract metallic particles that may be disposed in the lubricant 44. Metallic particles may result from component wear and may damage or reduce life of moving components of the axle assembly 10. The magnetic force from the magnets 170 may attract and hold the metallic particles against an adjacent wall of the lower brace 104, such as the first lower brace wall 160, and may thereby reduce the number of metallic particles that may be circulated by the lubricant.

The magnets 170 may be provided in any suitable quantity. For example, a plurality of magnets 170 may be arranged between the first end 150 and the second end 152 of the lower brace 104 that may be spaced apart from each other. Alternatively, a single magnet 170 may be provided.

The magnets 170 may be disposed between the lower brace 104 and the housing 20. As such, one or more magnets 170 may be disposed in the trench 46. As is best shown in FIGS. 4 and 6, the magnets 170 may be disposed between the first lower brace wall 160 and the bottom of the trench 46. In addition, the magnets 170 may be disposed between the first lower brace side wall 162 and the second lower brace side wall 164.

The magnets 170 may or may not be encapsulated in the lower brace 104. In FIG. 4, the magnet 170 is disposed between the housing 20 and the first lower brace wall 160 and is not encapsulated in the lower brace 104. In such a configuration, the magnet 170 may be positioned on the housing 20 before the lower brace 104 is installed in the trench 46 or the magnet 170 may be attached to the lower brace 104 before the lower brace 104 is inserted into the trench 46. The magnet 170 may be attached to the lower brace 104 in any suitable manner, such as with a fastener or an adhesive. In FIG. 6, the magnet 170 is encapsulated in the lower brace 104. More specifically, the magnet 170 is disposed inside the first lower brace wall 160 and is received in a magnet cavity 172 that may be provided in the first lower brace wall 160. One or more magnets 170 may be inserted into the magnet cavity 172 after the lower brace 104 is formed. Alternatively, the lower brace 104 may be formed or molded around the magnets 170.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a housing having a center portion and first and second arm portions that extend from the center portion;
   a differential that is disposed in the center portion and that has a ring gear; and
   a dam module that includes:
   first and second dams that are disposed in the first and second arm portions, respectively, the first and second dams each having an axle opening through which a corresponding axle extends and an inlet opening that is disposed above the corresponding axle;
   an upper brace that is disposed above the ring gear and that has a channel that receives a lubricant and transports the lubricant to the inlet openings; and
   a lower brace that is disposed below the ring gear and extends from the first dam to the second dam.

2. The axle assembly of claim 1 wherein the upper brace is received in the inlet opening of the first dam.

3. The axle assembly of claim 1 wherein the upper brace has a first end that is received in the inlet opening and engages the first dam.

4. The axle assembly of claim 1 wherein the lower brace is disposed below the axle opening of the first dam.

5. The axle assembly of claim 1 wherein the first dam has a lower wall that extends between the axle opening of the first dam and the housing, wherein the lower wall inhibits the lubricant from entering a lower brace cavity that is disposed between the lower brace and the housing.

6. The axle assembly of claim 1 wherein the first dam has a plurality of arms that extend away from the axle opening of the first dam, wherein the plurality of arms engages the first arm portion to secure the first dam to the first arm portion.

7. The axle assembly of claim 1 wherein the first dam includes a set of tabs that are disposed in the axle opening of the first dam, wherein members of the set of tabs are spaced apart from each other and are configured to flex when engaged by the corresponding axle.

8. An axle assembly comprising:
a housing having a center portion and an arm portion that extends from the center portion, wherein the arm portion receives an axle;
a differential that is disposed in the center portion and that has a ring gear; and
a dam module that includes:
a dam that is disposed in the arm portion, the dam having an axle opening through which the axle extends and an inlet opening that is disposed above the axle;
an upper brace that is disposed above the ring gear and that has a channel that receives a lubricant and transports the lubricant to the inlet opening; and
a lower brace that is disposed below the ring gear and extends from the dam, wherein a magnet is disposed between the lower brace and the housing.

9. The axle assembly of claim 8 wherein the lower brace has a first lower brace wall and the magnet is disposed inside the first lower brace wall.

10. An axle assembly comprising:
a housing having a center portion, a first arm portion that extends from the center portion, and a second arm portion that extends from the center portion and is disposed opposite the first arm portion;
a differential that is disposed in the center portion and that has a ring gear; and
a dam module that includes:
a first dam that is disposed in the first arm portion;
a second dam that is disposed in the second arm portion;
an upper brace that is disposed above the ring gear and that extends between the first dam and the second dam; and
a lower brace that is disposed below the ring gear and extends from the first dam to the second dam.

11. The axle assembly of claim 10 wherein the upper brace extends from the first dam to the second dam.

12. The axle assembly of claim 10 wherein the first dam has a first inlet opening, the second dam has a second inlet opening, and the upper brace has a channel that transports lubricant to the first inlet opening and the second inlet opening.

13. The axle assembly of claim 12 wherein the upper brace has a first end and a second end disposed opposite the first end, wherein the first end is disposed in the first inlet opening and engages the first dam and the second end is disposed in the second inlet opening and engages the second dam.

14. The axle assembly of claim 10 wherein the center portion of the housing has a trench that extends between the first arm portion and the second arm portion, wherein the lower brace is disposed in the trench.

15. The axle assembly of claim 14 further comprising a magnet disposed in the trench between the lower brace and the housing.

16. The axle assembly of claim 14 wherein the ring gear rotates about an axis and the lower brace has a first lower brace wall that extends from the first dam to the second dam, wherein the first lower brace wall extends along an arc that is radially disposed with respect to the axis.

17. The axle assembly of claim 16 wherein the first lower brace wall is spaced apart from the housing.

18. The axle assembly of claim 14 wherein the lower brace has a first lower brace wall, a first lower brace side wall, and a second lower brace side wall that is disposed opposite the first lower brace side wall, wherein the first lower brace side wall and the second lower brace side wall extend from the first lower brace wall into the trench and retain the lower brace in the trench.

19. The axle assembly of claim 18 wherein the first lower brace wall extends along an arc from the first lower brace side wall to the second lower brace side wall.

20. The axle assembly of claim 10 wherein the first dam has a first axle opening, the second dam has a second axle opening, and the lower brace is completely disposed below the first axle opening and the second axle opening.

* * * * *